United States Patent
Childress et al.

(10) Patent No.: US 8,365,245 B2
(45) Date of Patent: Jan. 29, 2013

(54) PREVIOUS PASSWORD BASED AUTHENTICATION

(75) Inventors: Rhonda L. Childress, Austin, TX (US);
Itzhack Goldberg, Hadera (IE); David Bruce Kumhyr, Austin, TX (US);
Moriel Lechtman, Haifa (IE)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 12/033,680

(22) Filed: Feb. 19, 2008

(65) Prior Publication Data

US 2009/0210938 A1 Aug. 20, 2009

(51) Int. Cl.
*G06F 21/00* (2006.01)

(52) U.S. Cl. .............. 726/2; 5/17; 5/22; 5/23

(58) Field of Classification Search ........... 726/5
See application file for complete search history.

(56) References Cited

U.S. PATENT DOCUMENTS

| | | | |
|---|---|---|---|
| 5,719,941 A | | 2/1998 | Swift et al. |
| 5,944,825 A * | | 8/1999 | Bellemore et al. ............ 726/18 |
| 6,754,349 B1 | | 6/2004 | Arthan |
| 7,249,261 B2 | | 7/2007 | Charbonneau |
| 7,475,812 B1 * | | 1/2009 | Novozhenets et al. ....... 235/382 |
| 2004/0078775 A1 | | 4/2004 | Chow et al. |
| 2004/0168068 A1 | | 8/2004 | Goal et al. |
| 2005/0125699 A1 | | 6/2005 | Harper |
| 2006/0032901 A1 * | | 2/2006 | Sugiyama et al. ............ 235/375 |
| 2006/0041756 A1 * | | 2/2006 | Ashok et al. ................. 713/183 |
| 2006/0048215 A1 | | 3/2006 | Brown et al. |
| 2006/0095785 A1 | | 5/2006 | White, Jr. |
| 2006/0294391 A1 | | 12/2006 | Wu |
| 2007/0174901 A1 | | 7/2007 | Chang et al. |
| 2007/0226791 A1 | | 9/2007 | Charbonneau |
| 2008/0077984 A1 * | | 3/2008 | Kim .............................. 726/18 |

FOREIGN PATENT DOCUMENTS

JP  2000082044 A  * 3/2000

* cited by examiner

*Primary Examiner* — Kambiz Zand
*Assistant Examiner* — Imhotep Durham
(74) *Attorney, Agent, or Firm* — Yee & Associates, P.C.; Steven Bennett

(57) ABSTRACT

Illustrative embodiments provide a computer implemented method, a data processing system, and a computer program product for previous password based authentication. In one illustrative embodiment, the computer implemented method comprises obtaining a combination of an identifier and a password and determining whether the password is current and correct. The computer implemented method responsive to determining the password is other than current and correct, prompting for an old password and determining whether the old password matches a previous password. Responsive to the old password matching a previous password, thereby creating a password match, permitting access to a resource.

18 Claims, 3 Drawing Sheets

PREVIOUS PASSWORD BASED AUTHENTICATION

BACKGROUND OF THE INVENTION

1. Field of the Invention

The present invention relates generally to an improved data processing system, and in particular to a computer implemented method, an apparatus and a computer program product for previous password based authentication.

2. Description of the Related Art

In current data processing systems, rigorous password rules and good security policy require a user to change an associated password at predetermined intervals. The need to make changes based on this policy may be responsible for many help desk calls, especially in the time immediately following the changing of a password. Shortly after a password has been changed, many users cannot remember the new password and are unable to log into the desired systems. The changed password must then be reset. The resetting of a password is time consuming, expensive and may create an opportunity to compromise the user account using social engineering.

With the exception of highly secure sites, most web sites and user portals do not require a time based password change, thereby reducing the site's and the user's security to avoid the expense of the surge of help desk calls. In systems that require periodic changing of passwords, the expired passwords, or rather the hashed value representation, are typically kept and used by the system password routines to enforce no early re-use of a previously used password. The passwords, however, are often etched into the memory of a user since the user has typed the passwords many hundreds of times to access the desired systems. A way is required to exploit the memory of the previously used password.

SUMMARY OF THE INVENTION

Illustrative embodiments provide a computer implemented method, an apparatus in the form of a data processing system, and a computer program product for previous password based authentication. In one embodiment, the computer implemented method comprises obtaining a combination of an identifier and a password and determining whether the password is current and correct. Responsive to determining the password is other than current and correct, prompting for an old password. The computer implemented method determines whether the old password matches a previous password and responsive to the old password matching a previous password, creating a password match. Responsive to the password match permitting access to a resource.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
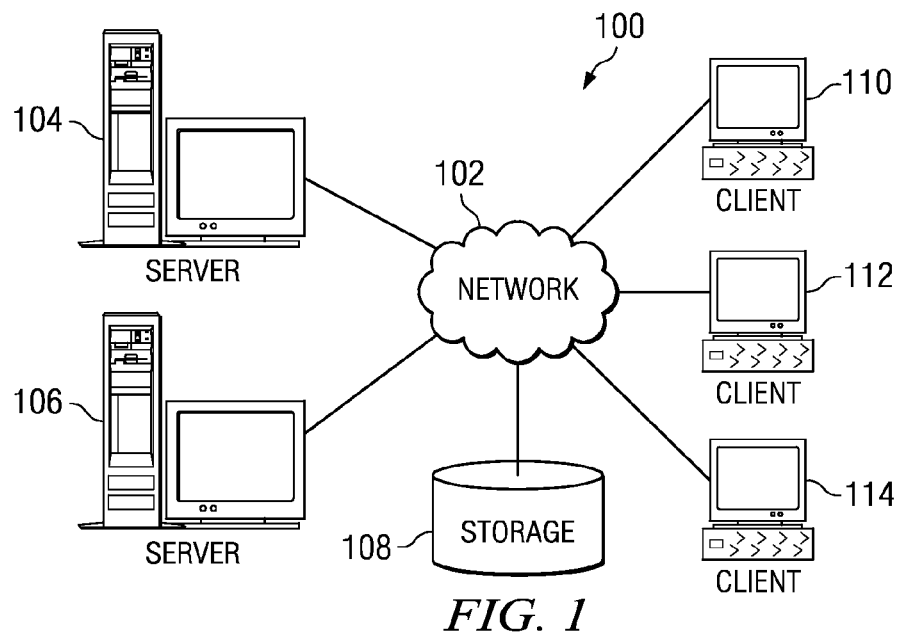
FIG. 1 is a pictorial representation of a network of data processing systems in which illustrative embodiments may be implemented.
Figure 2:
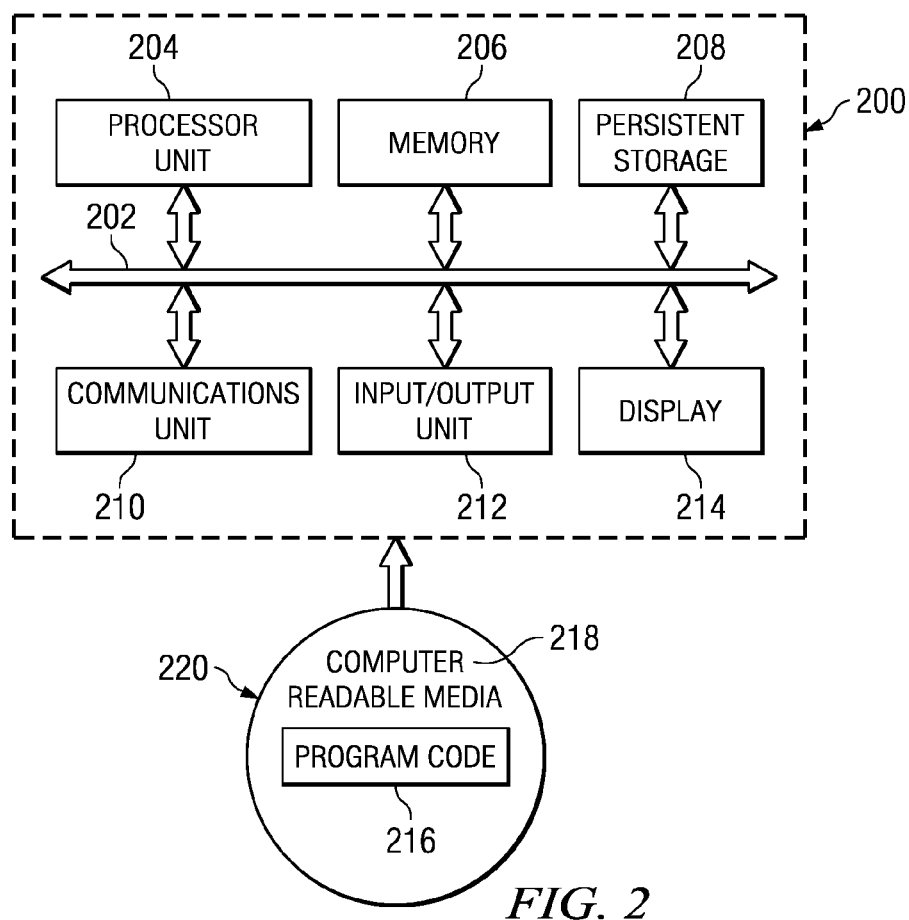
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Illustrative embodiments provide a capability for a user on client 110 to reset a previously forgotten password. Once reset, the user is allowed access to a resource such as the system having server 106 through network 102. The reset process is capable of being performed by the user using previously used passwords, without additional administrative assistance.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable recordable type media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a capability to a user on client 110 of FIG. 1, having forgotten a recently changed password needed to access a resource, such as server 106 to proceed to reset the forgotten password using a previous password or combination of previously used passwords for validation. Client 110 may send a request to password services on server 104 through network 102 to verify the previously used password. Once verified, the user may reset the forgotten password to a new password and access server 106.

Figure 3:
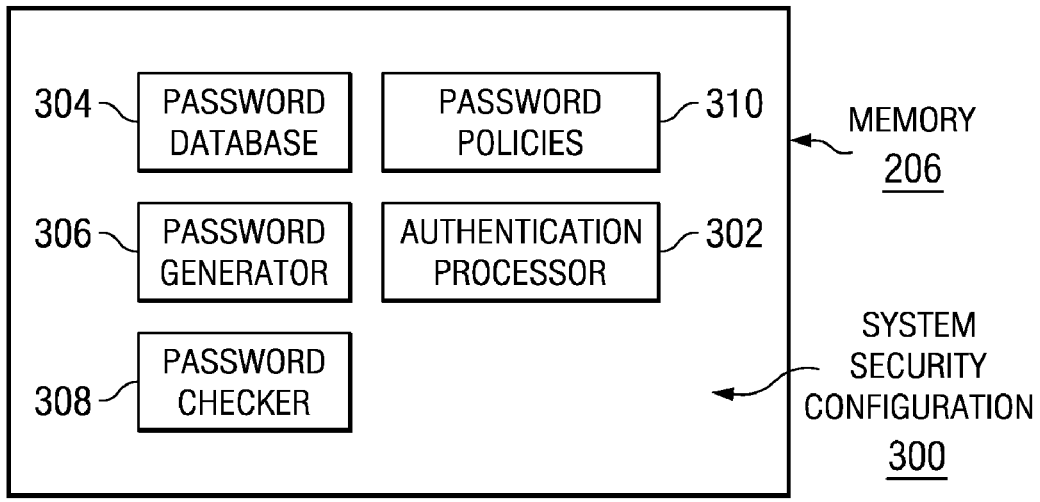
FIG. 3 is a block diagram of a portion of components of a previous password based authentication process in accordance with illustrative embodiments.

With reference now to FIG. 3, a block diagram of a portion of components of a previous password based authentication process in accordance with illustrative embodiments is shown. Components of a previous password based authentication process are shown within memory 206 of system 200 of FIG. 2. Other components as typically used within a data processing system, such as those previously described in FIG. 2 are not further described. Password authentication makes use of a number of system modules or components of system security configuration 300. Within system security configuration 300 exists security modules related to passwords, comprising authentication processor 302, password database 304, password generator 306, password checker 308, and password policies 310.

Authentication processor 302 provides a set of services used by the system and system users to validate usage of or access to system controlled resources. A set is considered to be one or more items. For example, a set of services comprises one or more services, wherein the services are items of the set. The processor may be able to process data from various forms of input including badge readers, keyboards, and biometric sources. Password database 304 contains stored versions of object passwords, where an object may include a person or a file or other system managed resource. A password database may store current and previous passwords in a suitable form for comparison with entered passwords used during an authentication session.

Password generator 306 is a set of services required to receive input in various accepted forms for the purpose of creating a new password associated with an object. This generator may be able to create passwords in a variety of forms to suit the needs of the systems on which the service is provided. For example, the service may create a short eight character user identifier based password, and it may also be capable of creating a larger password for a file.

Password checker 308 provides a service that may be used by the authentication processor to compare an input from a user against a stored value of a current password. This is a typical process in many systems where a user is prompted to provide an identifier and a password before being allowed to access a system.

Password policies 310 contain a set of rules that define the extent to which a password must be created and managed. For example, the password form criteria listing the acceptable characters and combination of characters, as well as the duration of a password may be contained and managed within. The policies may also invoke other services of authentication processor 302 to inform users of the impending expiration of passwords.

Figure 4:
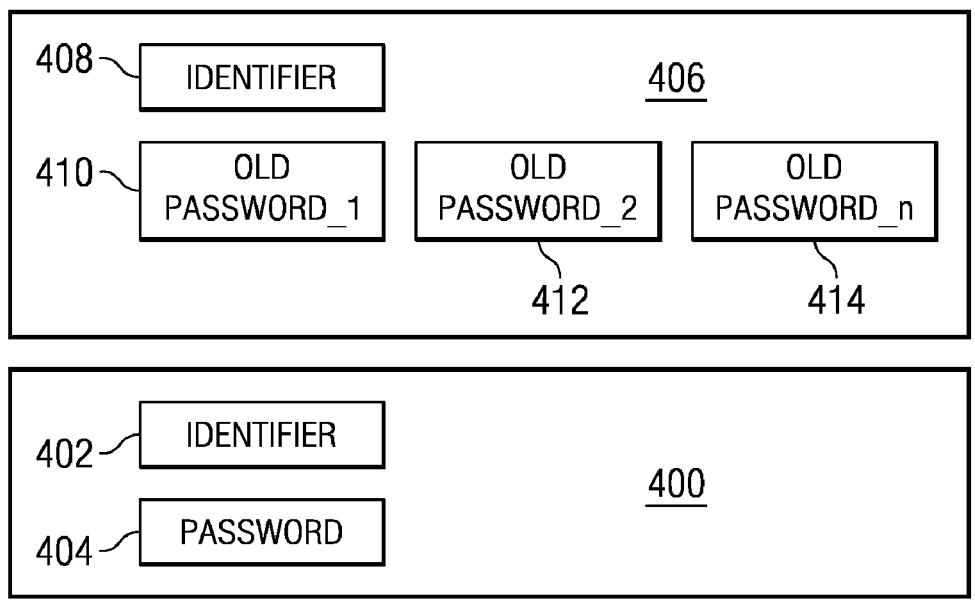
FIG. 4 is a block diagram of identifier and password combinations in accordance with illustrative embodiments.

With reference to FIG. 4, a block diagram of identifier and password combinations in accordance with illustrative embodiments is shown. In a first block, block 400, an identifier 402 is shown in conjunction with a password 404. Identifier 402 is typically a user ID, but may also be a resource name, such as a file or perhaps a device, such as a badge reader for a locked room. Password 404 is typically a user provided access code, but the password may also be provided by an application or service to verify permission to use a resource. Password 404 is a currently used, active password. Block 400 may also be representative of a portion of a user interface prompting a user to provide the user identifier and password for authentication purposes.

In second block 406, another combination of identifier 408 with old password_1 410, old password_2 412 and old password_n 414 is shown. The information content of block 406 differs from that of block 400 in that now there are more passwords and these are old, previously used passwords associated with the identifier. The number of old passwords required may be set by the password policies of the system.

When used as a portion of a user interface for user authentication, block 406 represents the input expected from a user before the user is allowed to proceed in a similar manner to that of block 400.

Figure 5:
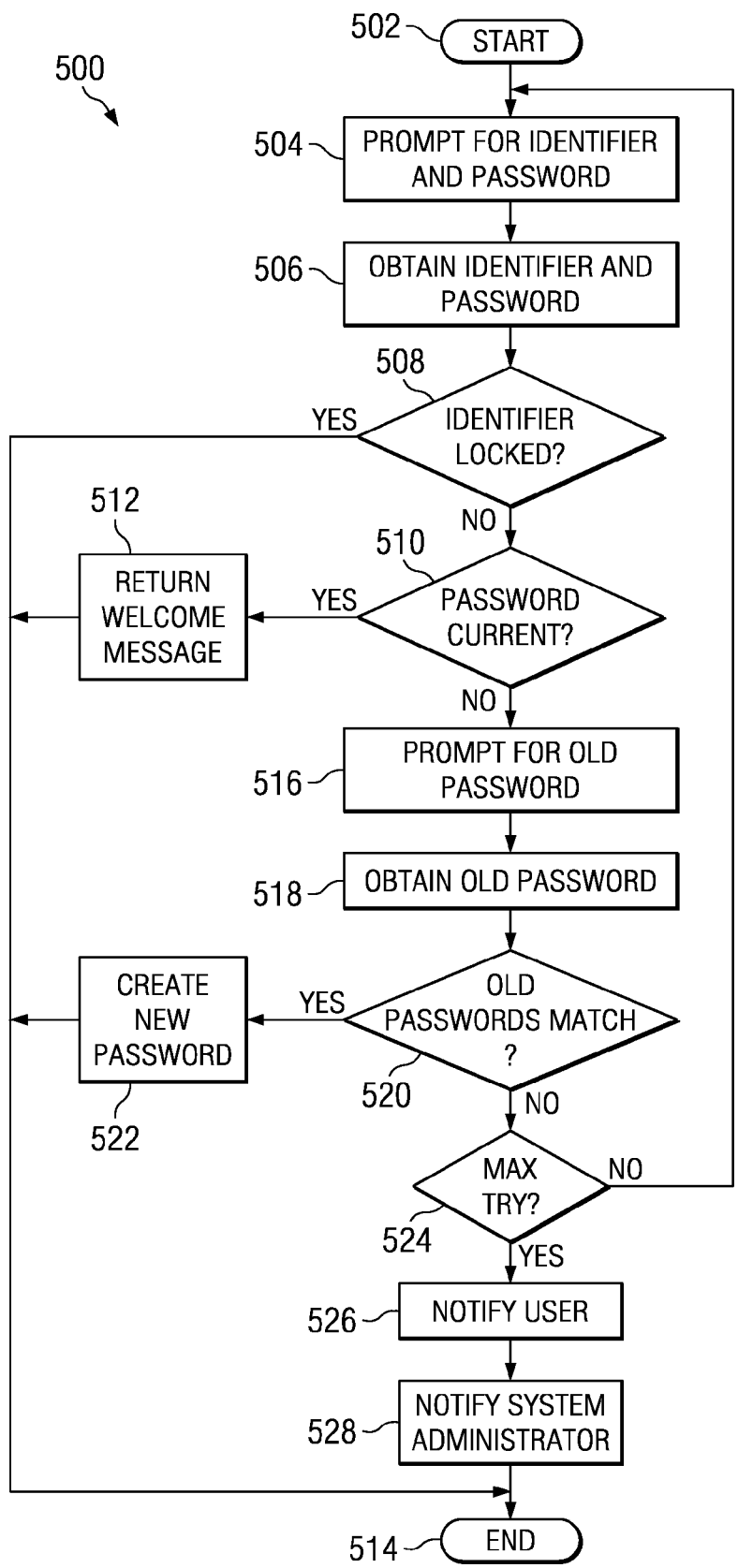
FIG. 5 is a flowchart of a previous password based authentication process in accordance with illustrative embodiments.

With reference to FIG. 5, a flowchart of a previous password based authentication process in accordance with illustrative embodiments is shown. Previous password authentication process 500 is an example of a process of authentication processor 302 of FIG. 3. Process 500 begins at start (step 502) and prompts a user for an identifier and password combination (step 504). An identifier and password combination is received in response to the prompt (step 506). A determination is made as to whether the identifier just received is locked, preventing any access (step 508). In addition to receiving in response to a prompt, the identifier and password combination may be obtained from other sources. Additional sources include reading from a file containing the identifier and passwords, a command line style of input or a script source providing programmatic input.

If the identifier in step 508 is locked, a "yes" is returned and process 500 terminates thereafter (step 514). If a "no" was returned in step 508, the identifier is usable and the password is checked to determine whether the password is current and correct by validating against the current password stored in the password database (step 510). If the result of step 510 is "yes," a welcome message is returned to the requesting user and process 500 terminates thereafter (step 514). A "current" password is the active or recently changed password that is presently in effect, as opposed to an old or previous password that has been superseded by the "current" password. The "correct" term means the password has met installation standards and has been verified against the stored version of the password.

If a "no" result is obtained in step 510, the password provided is old or incorrect and a prompt is issued for an old password (step 516). The old password is obtained (step 518) and a comparison is performed to determine if the old passwords match (step 520). A password match occurs when the input password compares equal to the stored password. Depending upon the password policies, one or more old passwords may be required to satisfy the prompt for old passwords of step 516. In the case of multiple old passwords, each provided old password is compared to a stored old password to determine a match. All passwords must match in accordance with the password policies. For example, if required to provide three old passwords A, B and C, then the provided old passwords would be compared to the stored old passwords of stored_A, stored_B and stored_C.

If the old passwords provided in step 518 match, a "yes" result is obtained from step 520. If the passwords do not match, a "no" results in step 520 and a determination is made as to whether a maximum number of tries or attempts to access has been attained. If the maximum tries permitted has been attained, a "yes" results and a notification is provided to a requesting user (step 526) and to a system administrator (step 528) with process 500 terminating thereafter (step 514).

If the maximum tries, or attempts, has not been attained, process 500 returns to start (step 502) to begin the process again. If however a password match was obtained in step 520, the requesting user has been authenticated using the old passwords and is allowed to create a new password in a self service manner (step 522). In this case, the user has been checked and allowed access to a resource, such as the system, but is typically routed to a password create and update process before going on to perform other work. The user has thus obtained desired access to a resource and a help desk call has been avoided. The resource to which access has been granted may typically initially be a system. The system may then require the updating of the old password to a new password, as in the usual password update routine. Access may also be granted to other resources, such as a user specific password vault or files as may be useful to re-establish the user on a system.

Thus, the illustrative embodiments provide an opportunity for a user having forgotten a recently changed password to use one or more old previously used passwords to gain access to the desired system. The user is thus enabled to perform a password reset in a different manner, while still subject to security authentication, but avoiding the use of more costly help desk resources.

In an illustrative embodiment, a computer implemented method for previous password based authentication, is provided. The computer implemented method obtains a combination of an identifier and a password and determines whether the password is current and correct. Responsive to determining the password is other than current and correct, the computer implemented method prompts for an old password and determines whether the old password matches a previous password. Responsive to the old password matching a previous password, the computer implemented method creates a password match. Responsive to the password match, the computer implemented method permits access to a resource. The desired resource may be a data processing system, a program, a file, a device such as a printer or other form of access controlled resource.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable recordable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for previous password based authentication, the computer implemented method comprising:
    obtaining, from a user, a combination of an identifier and a password to access a resource;
    determining whether the password is current and correct;
    responsive to determining the password is other than current and correct, prompting for a plurality of old passwords;
    obtaining, from the user, the plurality of old passwords;
    defining, by a password policy, a duration of the password and a duration of each one of the plurality of old passwords;
    setting, by the password policy:
        a quantity of the plurality of old passwords that are required to access the resource; and
        acceptable characters and combination of the acceptable characters that may be used for the password and the plurality of old passwords;
    invoking, by the password policy, a service of an authentication processor to inform the user of an impending expiration of the password and the plurality of old passwords;
    determining whether each of the plurality of old passwords matches each of a plurality of previous passwords that were each previously used by the user to access the resource, wherein each of the plurality of previous passwords is stored in association with the identifier;
    responsive to each of the plurality of old passwords matching each of the plurality of previous passwords, creating a password match; and
    responsive to the password match, permitting access to the resource.

2. The computer implemented method of claim 1 wherein determining whether the password is current and correct further comprises:
    determining whether the identifier is locked;
    responsive to determining the identifier is not locked, and the password current and correct, permitting access to the resource.

3. The computer implemented method of claim 1 wherein responsive to the password match permitting access to the resource further comprises:
    creating a new password before being allowed further progress on the resource.

4. The computer implemented method of claim 1 wherein determining whether each of the plurality of old passwords matches each of the plurality of previous passwords further comprises:
    responsive to a first of the old passwords not matching a first of the previous passwords, determining whether a maximum number of tries has been attained;
    responsive to the maximum number of tries having been attained, notifying the user and a system administrator and preventing access to the resource.

5. A data processing system for previous password based authentication, the data processing system comprising:
    a bus;
    a memory connected to the bus, the memory containing computer executable instructions;
    a communications unit connected to the bus;
    a display connected to the bus;
    a persistent storage connected to the bus; and
    a processor unit connected to the bus, wherein the processor unit executes the computer executable instructions to cause the data processing system to:

obtain, from a user, a combination of an identifier and a password to access a resource;
determine whether the password is current and correct;
responsive to determining the password is other than current and correct, prompt for a plurality of old passwords;
obtain, from the user, the plurality of old passwords;
define, by a password policy, a duration of the password and a duration of each one of the plurality of old passwords;
set, by the password policy:
   a quantity of the plurality of old passwords that are required to access the resource; and
   acceptable characters and combination of the acceptable characters that may be used for the password and the plurality of old passwords;
invoke, by the password policy, a service of an authentication processor to inform the user of an impending expiration of the password and the plurality of old passwords;
determine whether each of the plurality of old passwords matches each of a plurality of previous passwords that were each previously used by the user to access the resource, wherein each of the plurality of previous passwords is stored in association with the identifier;
responsive to each of the plurality of old passwords matching each of the plurality of previous passwords, create a password match; and
responsive to the password match, permit access to the resource.

6. The data processing system of claim 5 wherein the processor unit executes the computer executable instructions to cause the data processing system to determine whether the password is current and correct further comprises:
   determining whether the identifier is locked;
   responsive to determining the identifier is not locked, and the password current and correct, permitting access to the resource.

7. The data processing system of claim 5 wherein the processor unit executes the computer executable instructions to cause the data processing system to respond to the password match permitting access to the resource further comprises:
   creating a new password before being allowed further progress on the system.

8. The data processing system of claim 5 wherein the processor unit executes the computer executable instructions to cause the data processing system to determine whether each of the plurality of old passwords matches each of the plurality of previous passwords further comprises:
   responsive to a first of the old passwords not matching a first of the previous passwords, determine whether a maximum number of tries has been attained;
   responsive to the maximum number of tries having been attained, notifying the user and a system administrator, and preventing access to the resource.

9. A computer program product for previous password based authentication, the computer program product comprising:
   a computer readable recordable medium tangibly embodying computer executable instructions thereon, the computer executable instructions comprising:
   computer executable instructions for obtaining, from a user, a combination of an identifier and a password to access a resource;
   computer executable instructions for determining whether the password is current and correct;
   computer executable instructions responsive to determining the password is other than current and correct, for prompting for a plurality of old passwords;
   computer executable instructions for obtaining, from the user, the plurality of old passwords;
   computer executable instructions for defining, by a password policy, a duration of the password and a duration of each one of the plurality of old passwords;
   computer executable instructions for setting, by the password policy:
      a quantity of the plurality of old passwords that are required to access the resource; and
      acceptable characters and combination of the acceptable characters that may be used for the password and the plurality of old passwords;
   computer executable instructions for invoking, by the password policy, a service of an authentication processor to inform the user of an impending expiration of the password and the plurality of old passwords;
   computer executable instructions for determining whether each of the plurality of old passwords matches each of a plurality of previous passwords that were each previously used by the user to access the resource, wherein each of the plurality of previous passwords is stored in association with the identifier;
   computer executable instructions responsive to each of the plurality of old passwords matching each of the plurality of previous passwords for creating a password match; and
   computer executable instructions responsive to the password match for permitting access to the resource.

10. The computer program product of claim 9 wherein computer executable instructions for determining whether the password is current and correct further comprises:
   computer executable instructions for determining whether the identifier is locked;
   computer executable instructions responsive to determining the identifier is not locked, and the password current and correct, for permitting access to the resource.

11. The computer program product of claim 9 wherein computer executable instructions responsive to the password match for permitting access to the resource further comprises:
   computer executable instructions for creating a new password before being allowed further progress on the resource.

12. The computer program product of claim 9 wherein computer executable instructions for determining whether each of the plurality of old passwords matches each of the plurality of previous passwords further comprises:
   computer executable instructions responsive to a first of the old passwords not matching a first of the previous passwords, for determining whether a maximum number of tries has been attained; and
   computer executable instructions responsive to the maximum number of tries having been attained, for notifying the user and a system administrator, and preventing access to the resource.

13. The computer implemented method of claim 1, wherein the identifier is a name of a badge reader, and wherein the badge reader is for a locked room.

14. The computer implemented method of claim 1, further comprising:
   receiving input from a biometric source.

15. The data processing system of claim 5, wherein the identifier is a name of a badge reader, and wherein the badge reader is for a locked room.

16. The data processing system of claim 5, further comprising:
   receiving input from a biometric source.

17. The computer program product of claim 9, further comprising:
   receiving input from a biometric source.

18. The computer program product of claim 9, wherein the identifier is a name of a badge reader, and wherein the badge reader is for a locked room.

* * * * *